United States Patent
Kirchoff et al.

(10) Patent No.: US 11,703,179 B2
(45) Date of Patent: Jul. 18, 2023

(54) BRACKET FOR ALIGNING A COMPRESSOR TO AN ENGINE

(71) Applicant: Hanon Systems, Daejeon (KR)

(72) Inventors: James Kirchoff, Ann Arbor, MI (US); Michael G. Theodore, Jr., Plymouth, MI (US); Margaret Andrzejewski-Dressing, Livonia, MI (US); Mark Cogo, New Hudson, MI (US)

(73) Assignee: HANON SYSTEMS, Daejeon (KR)

( * ) Notice: Subject to any disclaimer, the term of this patent is extended or adjusted under 35 U.S.C. 154(b) by 11 days.

(21) Appl. No.: 17/370,248

(22) Filed: Jul. 8, 2021

(65) Prior Publication Data
US 2022/0136644 A1     May 5, 2022

Related U.S. Application Data

(60) Provisional application No. 63/107,501, filed on Oct. 30, 2020.

(51) Int. Cl.
    *F16M 13/02*     (2006.01)
(52) U.S. Cl.
    CPC .................................. *F16M 13/02* (2013.01)
(58) Field of Classification Search
    CPC .............................. F16M 13/02; B60H 1/3223
    USPC ........................................................ 248/674
    See application file for complete search history.

(56) References Cited

U.S. PATENT DOCUMENTS

| | | | | |
|---|---|---|---|---|
| 5,203,293 | A | * | 4/1993 | Shintani ................. F02B 67/06 123/195 A |
| 5,810,322 | A | * | 9/1998 | Zhao ..................... F25D 23/006 248/606 |
| 2009/0051237 | A1 | * | 2/2009 | Weber ................... D06F 37/206 411/338 |
| 2010/0148016 | A1 | | 6/2010 | Pacheco et al. |
| 2017/0127566 | A1 | * | 5/2017 | Imura ....................... F25B 1/00 |
| 2017/0343153 | A1 | * | 11/2017 | Yilmaz ..................... B60K 1/00 |

FOREIGN PATENT DOCUMENTS

| | | |
|---|---|---|
| CN | 204020486 U | 12/2014 |
| CN | 209972112 U | 1/2020 |
| JP | H07293447 A | 11/1995 |
| JP | 2019157976 A | 9/2019 |
| KR | 20080024007 A | 3/2008 |
| KR | 20200069895 A | 6/2020 |

* cited by examiner

*Primary Examiner* — Muhammad Ijaz
(74) *Attorney, Agent, or Firm* — Shumaker, Loop & Kendrick, LLP; James D. Miller (57) ABSTRACT

A compressor and aligning device assembly for aligning a compressor in a vehicle includes a bracket. The bracket is coupled to a body of the compressor. The bracket includes a hole formed therein. The hole is configured to receive a locating pin. The locating pin fixes the position of the compressor.

18 Claims, 7 Drawing Sheets

BRACKET FOR ALIGNING A COMPRESSOR TO AN ENGINE

CROSS REFERENCE TO RELATED APPLICATIONS

This application claims the benefit of U.S. Provisional Application No. 63/107,501, filed on Oct. 30, 2020. The entire disclosure of the above application is hereby incorporated herein by reference.

FIELD OF THE INVENTION

The invention relates to a bracket, and more particularly a bracket for aligning a compressor to an engine.

BACKGROUND OF THE INVENTION

An automobile typically includes an air conditioning (A/C) system. The A/C system includes a refrigerating circuit. Components of the A/C system include a compressor, an evaporator of a vaporizer, a condenser or a gas cooler, and an expansion device, with conduits connecting each of the components.

The compressor pumps a refrigerant through the conduits and the components. Typically, the compressor is powered by an engine of the vehicle. Power of the engine is transferred to the compressor via a drive belt. The drive belt is typically referred to as the Front End Accessory Drive (FEAD) belt.

Adequate belt tension is required to permit the FEAD belt to transfer a required torque. The belt tension prevents the belt from slipping over a drive pulley of the compressor. To accomplish the belt tension, a belt tensioner pulley typically applies a force to the FEAD belt that enables the belt to carry enough load to prevent it from slipping.

An issue with the belt tensioner is that it is an additional component. Disadvantageously, the belt tensioner adds cost, mass, an additional component that can fail thus reducing reliability, an extra parasitic loss to the FEAD drive system which causes increased fuel consumption, and a component that occupies valuable under hood space that might be needed for other engine accessories.

The FEAD belt tensioner can be eliminated, which eliminates the aforementioned disadvantages. However, to eliminate the tensioner, a special type of FEAD belt must be used, which is often referred to as a "stretchy" belt. The stretchy belt is elastic, which enables it to be stretched over the FEAD accessory pulleys using a stretch device. Once in place, the stretch device is relaxed and the stretchy belt contracts to a more compact shape that provides sufficient tension and resulting load to prevent slippage.

When the compressor is installed in place using a stretchy belt, the stretchy belt is pulled or expanded with the stretch device over the pulleys of the engine and the compressor pulley. Once the stretchy belt is pulled using the stretch device and by rotating/moving the compressor pulley, the belt can be properly positioned about the engine pulley and compressor pulley.

The compressor is positioned by locating upon the compressor pulley. However, the compressor can rotate about the pulley drive axis. Therefore, to prevent the compressor from rotating about the pulley axis during the assembly process, a locating pin is used that fixes the position of the compressor so that it can be securely positioned during the assembly process.

The locating pin must be received in a protrusion containing a hole on the compressor to be properly positioned. Adding the protrusion and the hole onto the compressor adds cost due to additional material usage and potential additional required machining operations, wherein the protrusion and hole is cast directly to the compressor body during manufacturing of the compressor body. Additionally, not all engines using a certain type of compressor will contain a stretchy belt, since some engines might require a tensioner for service accessibility reasons, etc. Therefore, if a compressor containing the locating pin protrusion is installed onto an engine containing the tensioner, then additional cost in the form of the superfluous protrusion and machined hole are added into the compressor.

Therefore, the total cost savings enabled by implementing the stretchy belt and eliminating the tensioner cannot be realized. This is because the additional material and/or machining for the feature that interfaces with the locating pin of the compressor adds cost to the compressor.

Accordingly, therefore it is desired to have a separate locating device for interfacing a locating pin that is capable of easily mounting to various new and/or existing compressors that may employ or desire to employ a stretchy belt. Desirably, the locating device minimizes cost, complexity, and material of machining, assembly, and maintenance.

SUMMARY OF THE INVENTION

In accordance and attuned with the present invention, a separate locating device for interfacing a locating pin that is capable of easily mounting to various new and/or existing compressors that may employ or desire to employ a stretchy belt, has surprisingly been discovered. The locating device minimizes cost, complexity, and material of machining, assembly, and maintenance.

In one embodiment, a compressor is fastened to an engine or other structure within a vehicle, wherein the compressor is driven via a belt that is elastic in nature and does not require a tensioning device. The compressor includes a bracket that prevents the rotation of the compressor about the drive axis during the assembly process to the vehicle, wherein the bracket is a component that is added to the compressor. The bracket may consist of a flange with hole that fastens to a portion of an outside of the compressor. A fastening means for fastening the bracket to the compressor body may be a bolt or a screw. The bracket may be produced from a material that is different from that of the compressor such as a metal. The bracket may include a protrusion, wherein the protrusion is made from a polymer, cardboard, or a pressed paper product, for example. Further, the bracket may contain an anti-rotation/locating feature that aligns with a complimentary feature on a body of the compressor. The protrusion and/or the bracket may also contain a fastening hook or a latching means. The latching means may be used to hold a wire or a connector such as an electrical type connector.

In another embodiment, a compressor that is fastened to an engine or other structure within a vehicle is driven via a belt that is elastic in nature and does not require a tensioning device. The compressor includes a protrusion that prevents the rotation of the compressor about the drive axis during the assembly process to the vehicle. The protrusion is a component that is added to the compressor and may be a sleeve-like body that fastens to an outside diameter of the compressor. The sleeve-like body may be attached to the compressor body is via an interference or press fit. Further, the protrusion may be produced from a material that is different than that of the compressor such as a polymer, a paper product, cardboard, and a pressed paper product, for example. The sleeve-like body may further include an anti-rotation/locating feature that aligns with a complimentary feature on a body of the compressor. It is further understood that the sleeve may be positioned between at least two features of the compressor. The two features may be a wire exit point from the clutch of the compressor and a mounting lug. The sleeve may also be properly spaced on the compressor assembly via a shim, wherein the shim is elastic in nature to enable tolerance compliance with interfacing parts. One of the protrusion or the sleeve-like body may contain a fastening hook/latching means. The latch may be used to hold a wire or a connector such as an electrical type connector, for example.

BRIEF DESCRIPTION OF THE DRAWINGS

Example embodiments of the invention are described in greater detail below on the basis of the figures. These show, to some extent in highly simplified representations.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

As used herein, substantially is defined as "to a considerable degree" or "proximate" or as otherwise understood by one ordinarily skilled in the art. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer.

As used herein "configured to" is a structural term and refers to the structure of the apparatus being disclosed. Unless otherwise noted, as used herein, the verbiage "separately formed" when referring to components separately formed from a compressor refers to parts not being cast with the compressor or machined onto the compressor with expensive tooling, machining, and cast parts. Rather, "separately formed" means that the components are easily coupled to the compressor with no additional or minimal recasting, retooling, or additional machining. For example, easily coupled to means coupling a component to the compressor by a fastener, bolt, pin, friction fit, non-complex welding or sodering, clamping, riveting, or similar type mounting or fastening means that minimize complexity of assembly.

As used herein, "a stretchy belt" is a commonly known pulley belt used to transmit torque between an engine pulley, such as a combustion engine pulley, of a combustion engine vehicle. The stretchy belt is commonly used as an efficient and lower cost assembly and maintenance means in place of a belt employing a belt tensioner. The stretchy belt can be used on a compressor of an air conditioning system, although it is understood in the field of the art that the stretchy belt can be used as a belt used to transmit torque for other operations of a vehicle or for other mechanical operations where torque transmission between two components is desired. Additionally, the compressor disclosed herein can be an A/C compressor for a combustion engine vehicle, an electric vehicle, or a hybrid, if desired, wherein an anti-rotation locating pin, as described in further detail herein below, is employed to align and affix a body of the compressor of the vehicle to the engine or other frame or support of the vehicle.

FIGS. 1-4 illustrate a compressor and aligning device assembly 10 according to the embodiment of disclosure. The aligning device assembly 10 includes a compressor 12 and an aligning device 14. The compressor 12 includes a pulley 16 for receiving a stretchy belt or other torque transmitting device. The pulley 16 is configured to align with a pulley (not shown) of an engine (not shown) of a vehicle.

The aligning device 14 is configured as a bracket affixed to a body 18 of the compressor 12. An anti-rotation locating pin hole 20 is formed in the aligning device 14. The hole 20 formed in the aligning device 14 is configured to receive a locating pin 22 (schematically shown in FIG. 1) that fixes a position of the compressor 12 during assembly with the engine of the vehicle. The locating pin 22 is typically coupled to a bracket and/or support frame assembly (not shown) of the vehicle.

Figure 1:
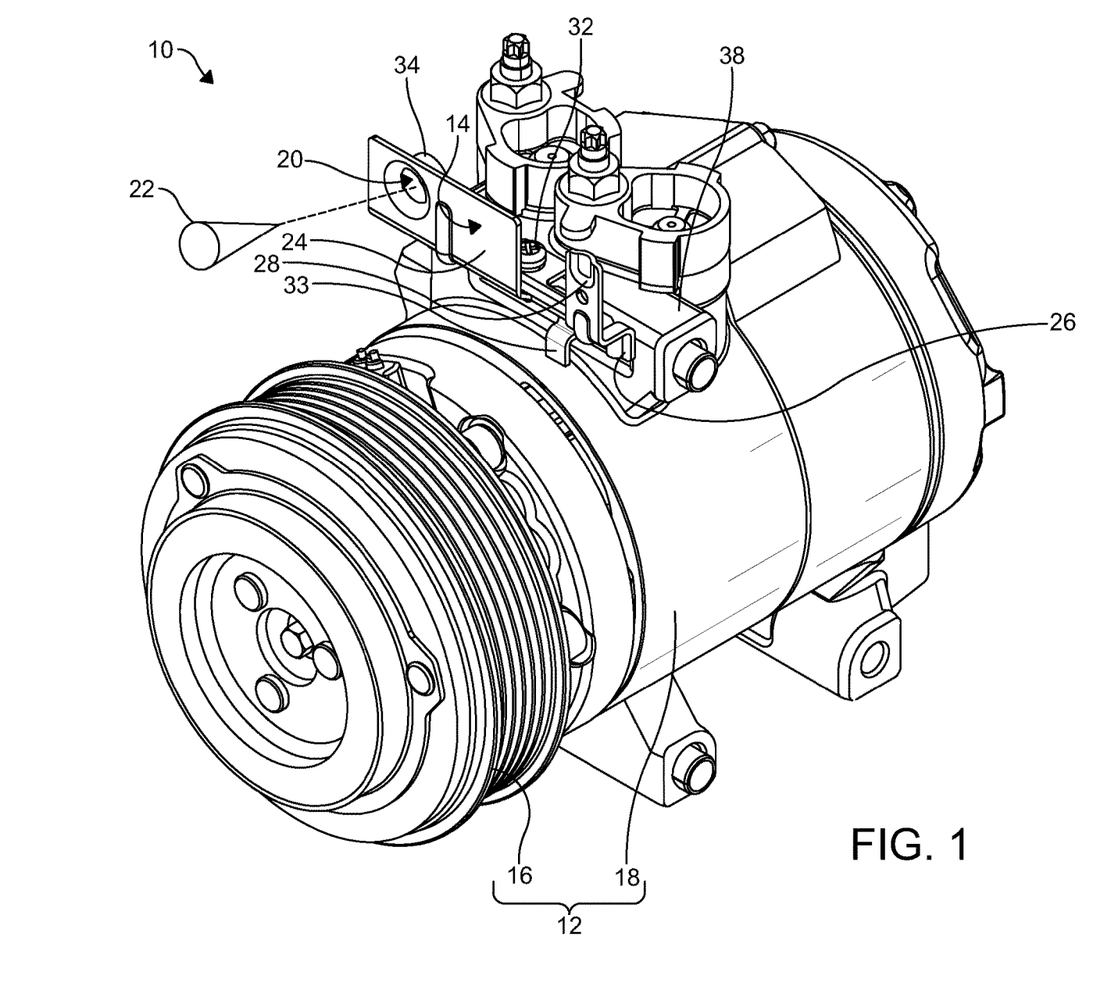
FIG. 1 is a top perspective view of a compressor and aligning device assembly according to an embodiment of the invention.
Figure 2:
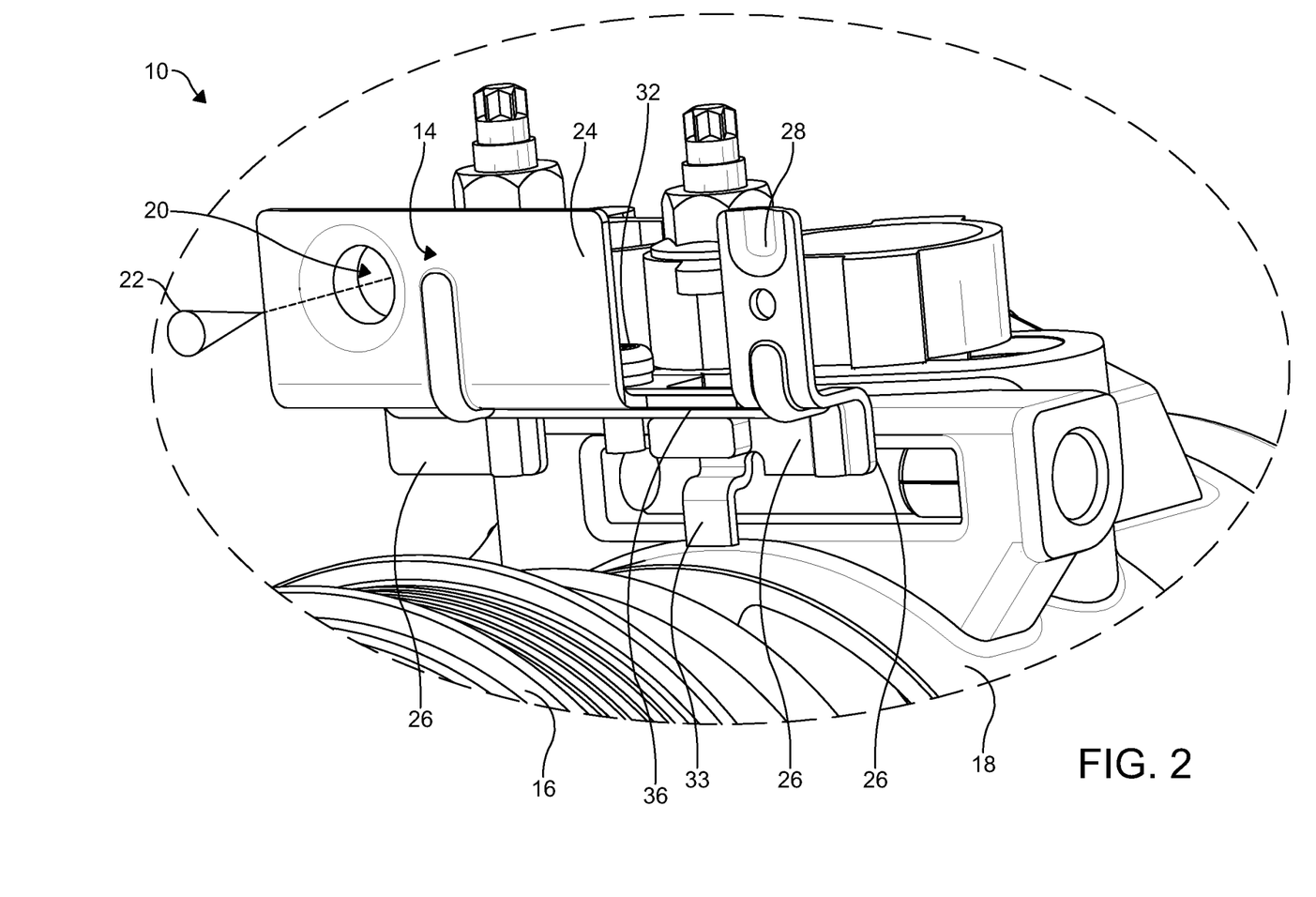
FIG. 2 is an enlarged fragmentary front perspective view of a bracket of the compressor and aligning device assembly of FIG. 1.
Figure 3:
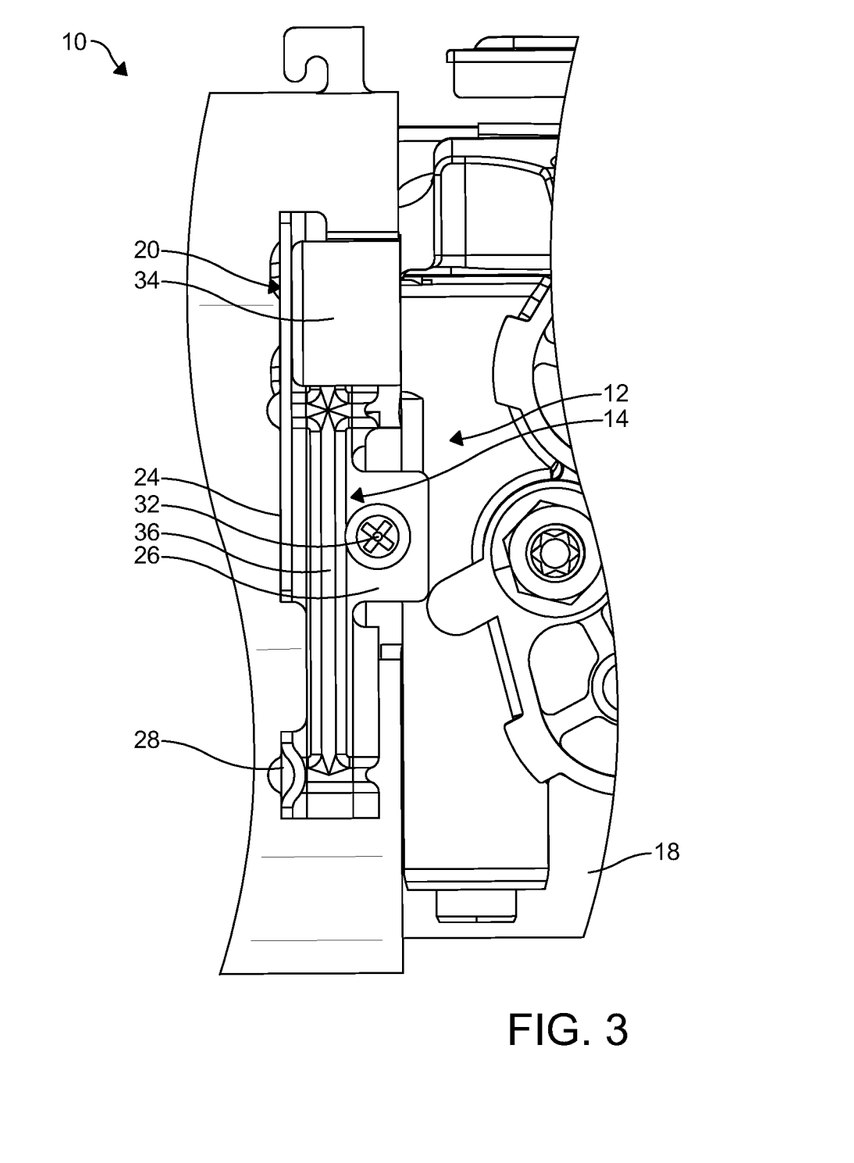
FIG. 3 is an enlarged fragmentary top plan view of the bracket of the compressor and aligning device assembly of FIGS. 1-2.
Figure 4:
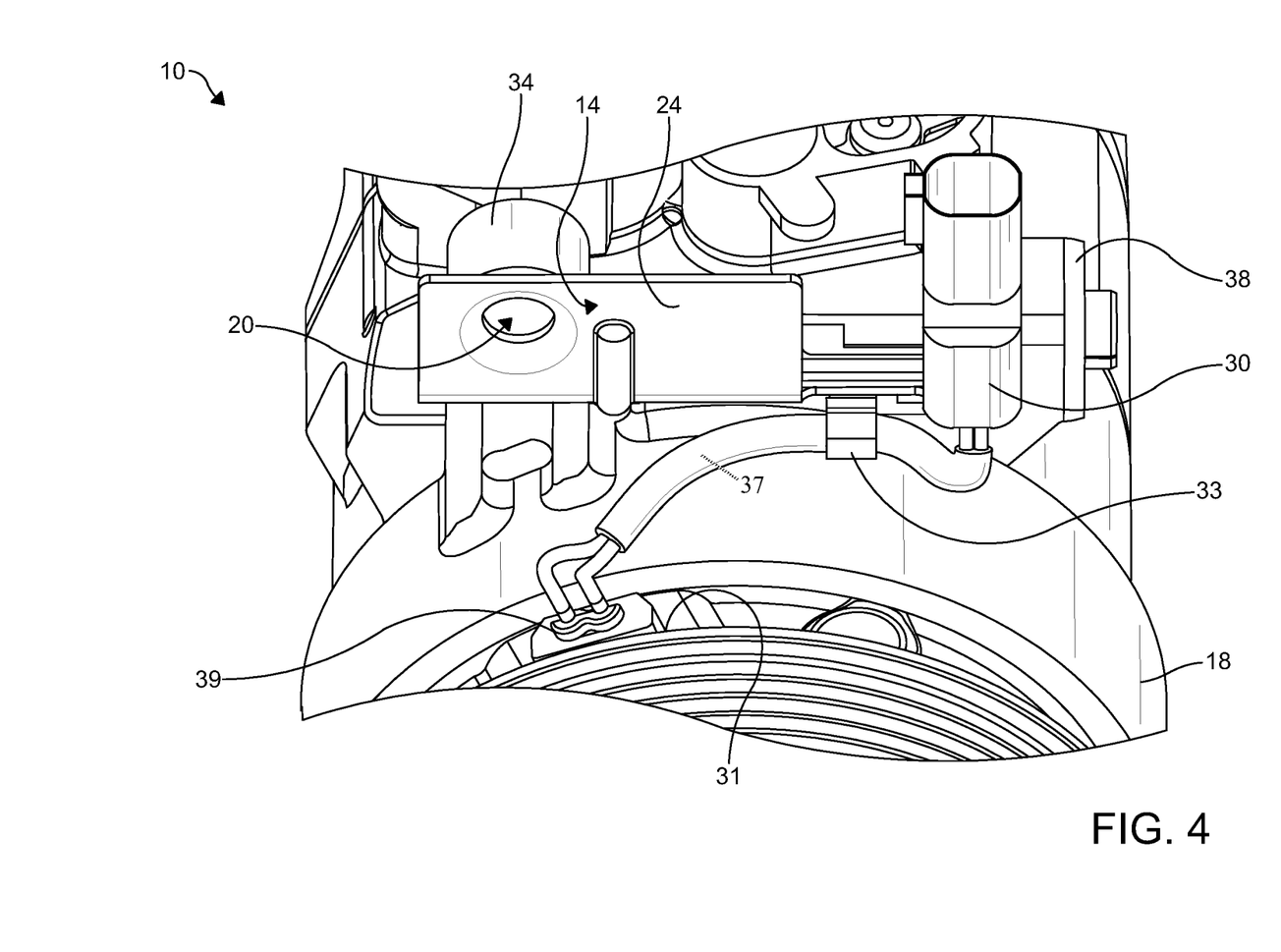
FIG. 4 is an enlarged fragmentary front perspective view of the bracket of the compressor and aligning device assembly of FIGS. 1-2 with clutch wires and connector coupled to the compressor and aligning device assembly of FIGS. 1-3.

In the embodiment shown, the aligning device 14 includes a planar plate 24 including the hole 20 formed therethrough, a brace 36 for engaging directly to the body 18 of the compressor 12, and flanges 26. The flanges 26 militate against rotation of the aligning device 14 about the brace 36 by abutting against a mounting lug 38 or other structure of the body 18 of the compressor 12. The planar plate 24 extends substantially perpendicular to a rotational axis of the pulley 16 of the compressor 12 and substantially perpendicular to the brace 36. The aligning device 14 may further include a locating tab 28 that positions a connector 30 of an electric clutch 31 of the compressor 12 as needed to interface with an engine harness. A cylindrical protrusion 34 extends outwardly from the plate 24 about the hole 20 to provide further surface area to maintain and receive the locating pin 22.

To attach the aligning device 14 to the body 18 of the compressor 12, a fastener 32 such as a bolt, a screw, or another fastener is used to mount to the compressor 12 using a tapped hole formed in the body 18 of the compressor 12. It is understood that other joining methods can be used as desired such as a friction fit or weld, for example. Additionally, the aligning device 14 can be formed integrally with the body 18 during the forming of the compressor 12.

An additional feature can also be derived from the disclosure by incorporating various wire routing structures into the aligning device 14. An example of such a feature is shown FIG. 4, wherein a routing structure 33 for wires 37 are shown. As shown, the routing structure 33 is configured as a tab or hook with an L-shaped cross-section. However the routing structure 33 can be a tab with a U-shaped cross-section, a polygonal shaped cross-section, a cylindrical conduit for receiving the wires 37, or other types of structure for routing and securing the wires 37. The routing structure 33 is used as a "tie down" point and eliminates the need for further fastening means to be added to the compressor 12, thereby eliminating additional parts and labor.

Figure 5:
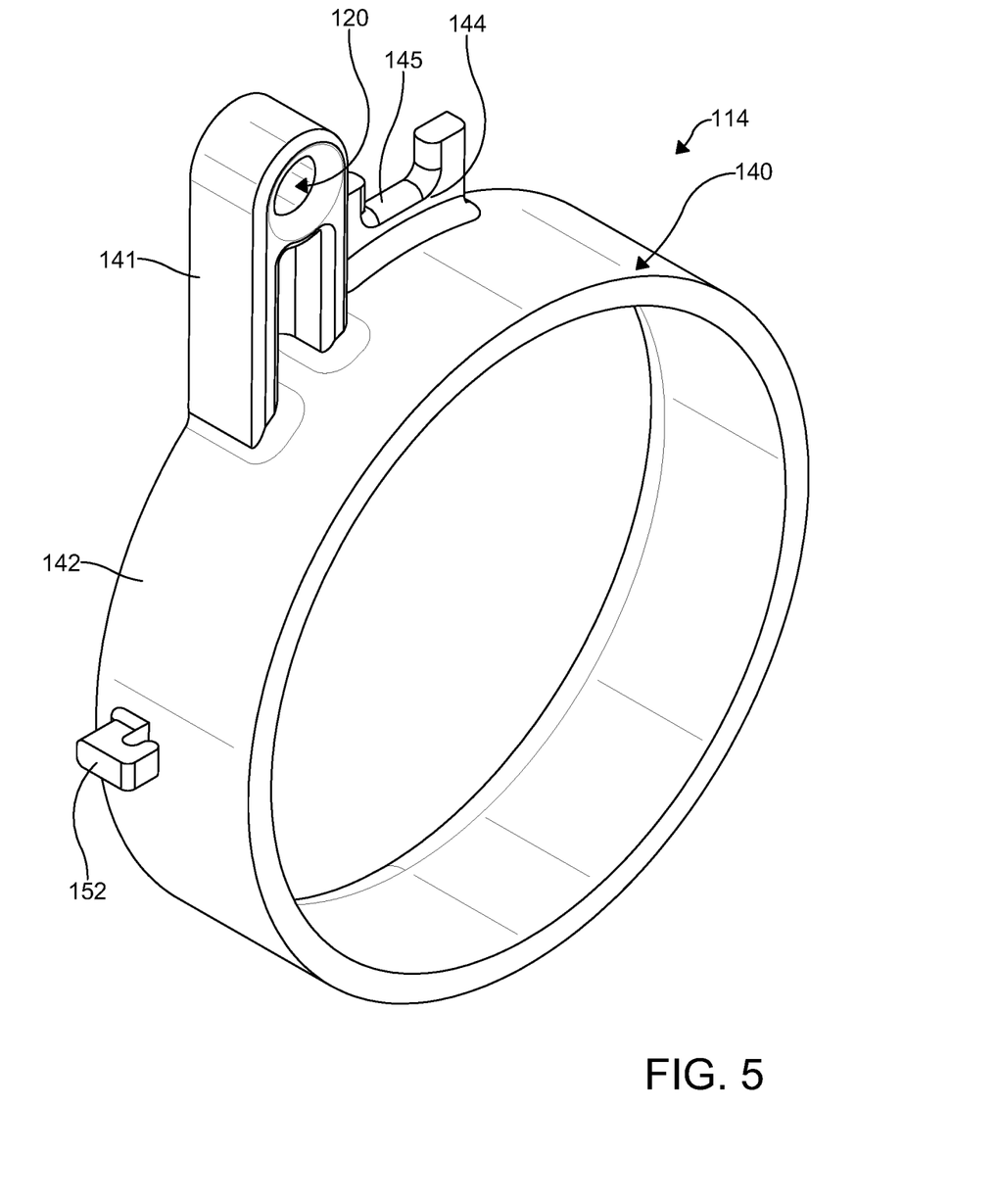
FIG. 5 is a left side perspective view of a bracket according to another embodiment of the invention.
Figure 6:
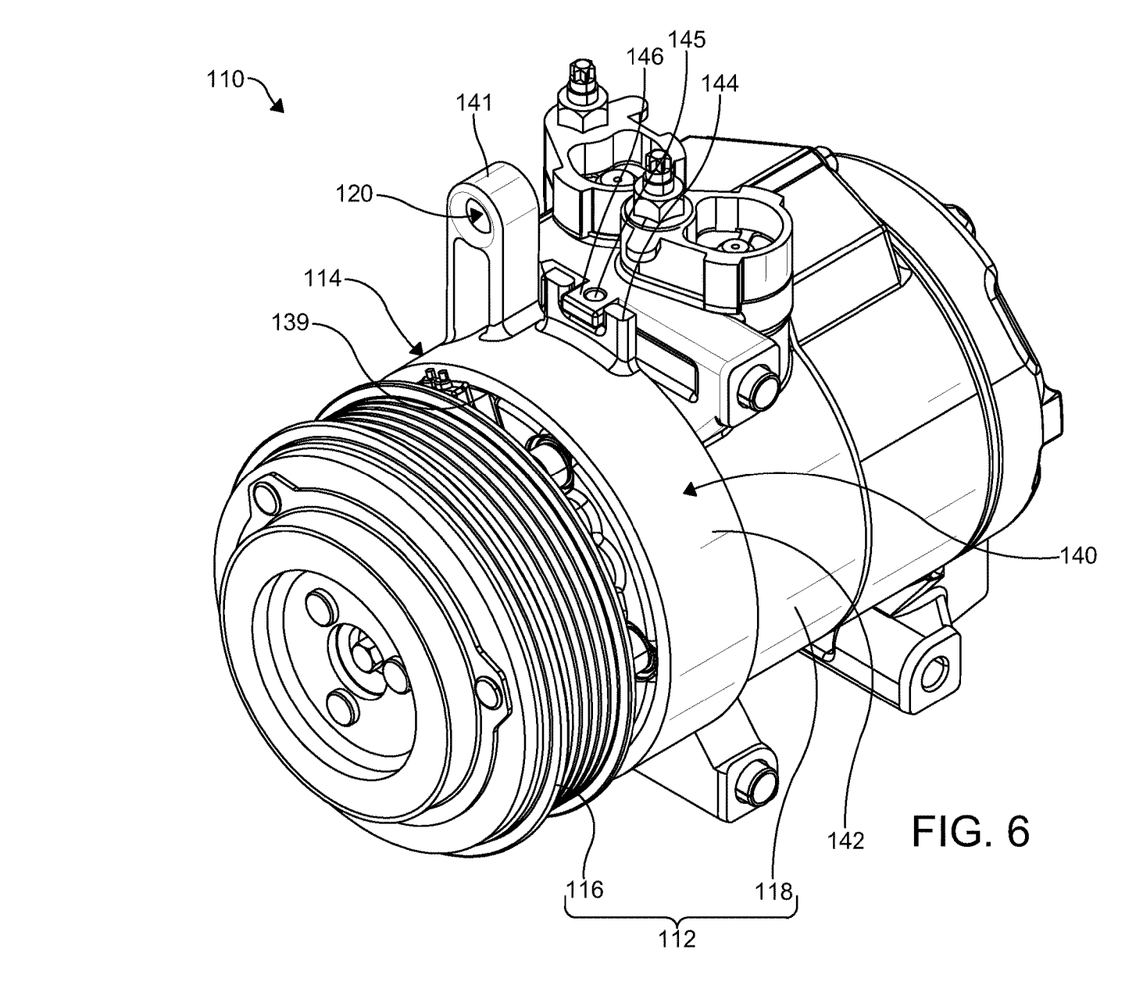
FIG. 6 is a top perspective view of a compressor and aligning device assembly with the bracket of FIG. 5.
Figure 7:
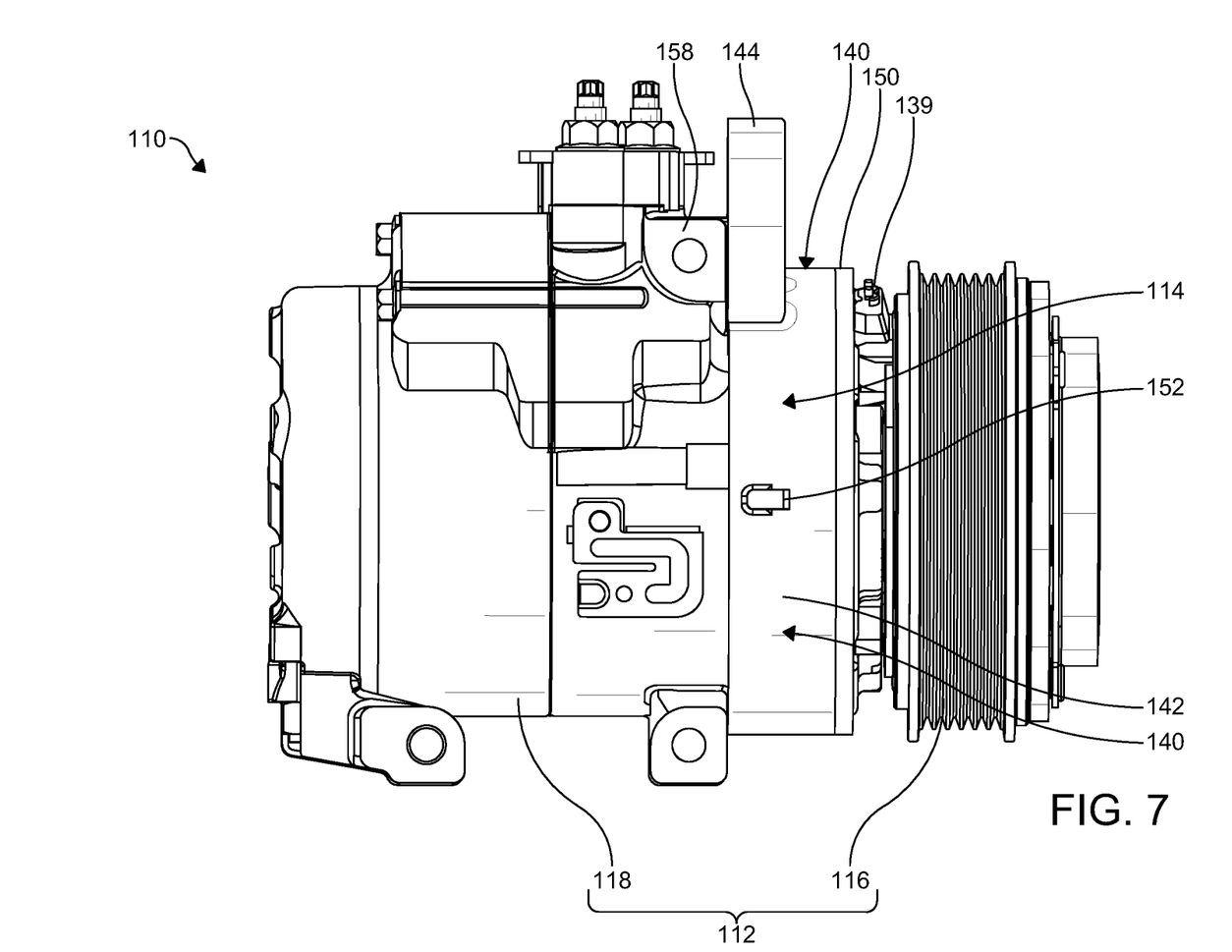
FIG. 7 is a left side elevational view of the compressor and aligning device assembly of FIG. 6.

A compressor and aligning device assembly 110 according to an alternate embodiment of the disclosure is shown in FIGS. 5-7. Features of the compressor and aligning device assembly 110 of FIGS. 5-7 similar to the compressor and aligning device assembly of FIGS. 1-4 are indicated with the same numerals with a preceding one "1" for simplicity. In the embodiment illustrated, the anti-rotation locating pin hole 120 is part of a sleeve 140 configured as a bracket that is affixed around the body 118 of the compressor 112. In the embodiment shown, the sleeve 140 includes a generally cylindrical or ring-like portion 142 that can be press fit or interference fit on the body 118 of the compressor 112. It is understood that other joining methods can be used as desired such as clamping the sleeve 140 about the body 118 of the compressor 112. The hole 120 is formed in a protrusion 141 extending outwardly from an outer surface of the sleeve 140. The sleeve 140 further includes a tab 144 with a slot 145 that receives a key tab 146 therein that is formed on the mounting lug 38 of the compressor 112 and positions the sleeve 140 radially in a proper orientation on the compressor 112. It is understood the key tab 146 can be formed elsewhere on the compressor 112 depending on the type of compressor and therefore the slot 145 would be formed in alignment with the key tab 146. As shown, the tab 144 with the slot 145 is substantially U-shaped. However, the tab 144 with the slot 145 can have other cross-sectional shapes as desired.

To prevent the sleeve 140 from sliding axially along a length of the compressor 112, the sleeve 140 may be disposed between or sandwiched between two hard stop features. In the embodiment shown, one is the compressor mounting lug 138 and the other is the wire exit point 139 from the clutch 131 of the compressor 112. It is understood that other means can be used to militate against axial movement of the sleeve 140 on the body 118 of the compressor 112 as desired The sleeve 140 can be further enhanced by using a common part amongst many different applications to enable a high volume common part. This will reduce part count and cost. To accommodate varying positions of the mounting lugs 138 and the wire exit points 139 from the clutch 131 of the compressor 112, a shim 150 may be added to provide adequate spacing compensation or tolerances to hold the sleeve 140 in place. The shim 150 can be further enhanced to be elastic in nature, to allow compression of the material used for the sleeve 140 that will enable highly variable tolerances of components used. As such, the shim 150 elastically expands and contracts as needed to allow for tolerances. By opening or enlarging tolerances, costs can be further reduced.

As shown in FIGS. 5 and 7, the sleeve 140 includes a hook or a latch portion 152. The hook or the latch portion 152 can be used as a wire "tie down" point and eliminates the need for further fastening means to be added to the compressor 112 or the sleeve 140, thereby saving in cost by elimination of parts and labor. Additionally, similar to the embodiment illustrated in FIGS. 1-4, a locating tab or other attachment clip could be added that could anchor the clutch wires and the connector 130, which would eliminate metal brackets and fastening means. Overall, the cost of the compressor 112 can be further reduced.

A novel approach has been developed that provides an easily added anti-location locating pin hole 20, 120 that interfaces with the locating pin 22, 122 to the compressor 12, 112 that can be added when necessary in the manufacturing process and/or replacement and maintenance process. In this embodiment, the aligning device 14, 114 may be produced from a low cost material to create a further optimized solution. The aligning device 14, 114 is adaptable to be included with new or existing compressors originally include or do not include a belt tensioner.

The invention is not limited to the exemplary embodiments described above. Rather, one skilled in the art can also derive other variants of the invention therefrom without departing from the subject matter of the invention. In particular, all the individual features described in conjunction with the exemplary embodiments can also be combined in other ways without departing from the scope of the invention.

What is claimed is:

1. An aligning device assembly comprising:
   a compressor;
   a bracket coupled to a body of the compressor, the bracket including a hole formed therein, the hole configured to receive a locating pin that fixes a position of the compressor; and
   a routing structure, wherein the routing structure receives and secures wires.

2. The aligning device assembly of claim 1, wherein a fastener couples the bracket to the compressor.

3. The aligning device assembly of claim 1, wherein the bracket is configured as a sleeve.

4. The aligning device assembly of claim 3, wherein the sleeve is properly spaced on the compressor by a shim, wherein the shim is elastically configured to facilitate tolerance compliance.

5. The aligning device assembly of claim 3, wherein the hole is formed in a protrusion extending outwardly from an outer surface of the sleeve.

6. The aligning device assembly of claim 1, further comprising a locating tab, wherein a connector for a clutch of the compressor is mounted to the locating tab.

7. The aligning device assembly of claim 1, wherein the bracket includes a brace and a plate extending from the brace, wherein the hole is formed through the plate.

8. The aligning device assembly of claim 1, wherein the bracket includes anti-rotational flanges formed thereon.

9. The aligning device assembly of claim 1, wherein the compressor includes a key tab extending outwardly therefrom and the bracket includes a slot for receiving the key tab.

10. An aligning device assembly comprising:
- a compressor including a pulley for receiving a stretchy belt; and
- an aligning device coupled to the compressor, the aligning device including an anti-rotation locating pin hole, the anti-rotation locating pin hole receiving a locating pin therein, wherein the aligning device is one of a sleeve and a bracket having a plate.

11. The aligning device assembly of claim 10, further comprising a locating tab formed thereon for receiving a connector for a clutch of the compressor.

12. The compressor or aligning device assembly of claim 10, wherein the aligning device is the bracket having the plate, wherein the anti-location rotating pin is formed through the plate, the plate extending from a brace directly coupled to the compressor, and wherein flanges extend from the bracket.

13. The aligning device assembly of claim 10, further comprising a routing structure extending therefrom for positioning wires.

14. The aligning device assembly of claim 10, wherein the aligning device is the sleeve including a cylindrical portion and a protrusion extending outwardly from an outer surface of the cylindrical portion, a tab include the anti-rotation locating pin hole, and wherein a latch portion extends outwardly from the outer surface of the cylindrical portion to position wires.

15. The aligning device assembly of claim 10, wherein the aligning device is the sleeve and a shim is disposed intermediate the sleeve and the pulley.

16. The aligning device assembly of claim 15, wherein the shim elastically expands and contracts to accommodate for tolerances between the shim and the compressor.

17. The aligning device assembly of claim 10, wherein the aligning device is the sleeve, wherein a slot is formed in the sleeve, the slot receives a key tab formed on the compressor.

18. A compressor and aligning device assembly for aligning the compressor in a vehicle comprising:
- a bracket coupled to a body of the compressor, the bracket including a hole formed therein, the hole configured to receive a locating pin that fixes a position of the compressor, wherein the bracket is configured as a sleeve, wherein the sleeve is properly spaced on the compressor by a shim, and wherein the shim is elastically configured to facilitate tolerance compliance.

* * * * *